United States Patent [19]

Tsuchiya et al.

[11] 4,163,763
[45] Aug. 7, 1979

[54] METHOD FOR PRODUCING CURABLE RESIN AND CURABLE COATING COMPOSITION

[75] Inventors: Shozo Tsuchiya, Tokyo; Hideo Hayashi; Makoto Sasaki, both of Yokohama; Kiyoshi Goto; Toru Matsubara, both of Kyobashi, all of Japan

[73] Assignee: Nippon Oil Company, Limited, Tokyo, Japan

[21] Appl. No.: 861,198

[22] Filed: Dec. 16, 1977

[30] Foreign Application Priority Data

Dec. 23, 1976 [JP] Japan ................. 51-154210

[51] Int. Cl.² ............................................. C08F 279/02
[52] U.S. Cl. .................................... 525/290; 526/283; 526/308; 525/297; 525/305
[58] Field of Search ................ 526/281, 283, 308; 260/879

[56] References Cited

U.S. PATENT DOCUMENTS

| | | | |
|---|---|---|---|
| 3,957,736 | 5/1976 | Tsuchiya | 526/283 |
| 4,037,038 | 7/1977 | Tsuchiya | 526/283 |
| 4,064,199 | 12/1977 | Nishikawa | 526/283 |

*Primary Examiner*—Paul R. Michl

*Attorney, Agent, or Firm*—Paul J. Sutton

[57] ABSTRACT

The present invention provides a method for producing curable resin which comprises reacting acrylic acid and/or methacrylic acid [which is hereinafter cited as (metha-) acrylic acid] with hydroxyl group-containing resin (I) obtained by reacting a five-member cyclic compound having an unsaturated conjugated double bond represented by the general formula (A) given below;

GENERAL FORMULA (A):

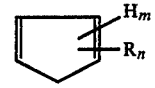

(wherein R is an organic residue having from 1 to 3 carbon atoms; m and n are integers and are in the relation of m+n=6) or the Diels-Alder addition product thereof (A) and a compound (B) having both reactive carbon-carbon double bond or bonds and two or more hydroxyl groups within one and the same molecule thereof. In accordance with the present invention, curable coating composition comprising said curable resin can also be obtained. The resin of this invention can be very quickly cured by the exposure to heat or radiation.

2 Claims, No Drawings

METHOD FOR PRODUCING CURABLE RESIN AND CURABLE COATING COMPOSITION

BACKGROUND OF THE INVENTION

1. Field of the Invention

The present invention relates to a method for producing new curable resin capable of being cured by the exposure to radiation or heat.

2. Prior Art

Recently there has been a great demand for coating composition having high curing speed. Particularly, the demand for the improvement of printing speed has been increasing along with the development of the printing technology. With the increase in the demand for higher printing speed, the serious demand for the drying speed (curing speed) of printing inks has been more and more growing. In the conventional high speed printing, the printed products are dried up by direct-heating system or by hot-air system as the means for promoting the drying up of the printed products. From 30 to 40% of the solvent contained in the printing inks which are used in such heat-set printing as mentioned above is evaporated by heating to dry the inks. Therefore, a part of the solvent vapor produced in the printing factories, causes pollution problems more often than ever.

Therefore, printing inks of such a type as can be dried up by some means or other without the need for discharging such volatile material as mentioned above, have been desired for by those skilled in the art.

Under these circumstances, there are demands for printing inks which can be dried without being accompanied by the evaporation of solvent, such as ultraviolet ray curing inks or thermosetting type nonsolvent inks. In fact there have already been made proposals for such printing inks.

For example, in Kokai Patent Publication No. 124133/74 it is disclosed that excellent mutual solubility and curing property can be attained when resin obtained by esterifying copolymer resin of dicyclopentadiene and allyl alcohol with (metha-)acrylic acid, is used as curable ink.

However, when the resin disclosed in the above cited Kokai Patent Gazette is used as the curable coating composition, drying speed is not sufficient, and in particular, the resin disclosed in the above cited Kokai Patent Gazette is used as printing ink composition, exposure sensitivity thereof is poor, thus it is not sufficiently adopted for high speed printing so that the printing inks of this type do not meet the original requirement of the printing inks for high speed printing.

OBJECTS AND SUMMARY OF THE INVENTION

An object of the present invention is to provide a method for producing curable resin having excellent property capable of being cured without being accompanied with the evaporation of solvent, and to provide a curable coating composition which contains said resin.

Another object of this invention is to provide a method for producing curable resin capable of being very quickly cured by heat or radiation, and to provide a curable coating composition, for example for printing inks which contain said resin.

Further, another object of this invention is to provide a curable resin having excellent curing speed and preferable properties such as fluidity or emulsifying property when used as the composition for printing inks, and to provide a curable coating composition for printing inks containing said resin.

The above mentioned objects and other objects of this invention will be clarified from the below given description.

A method for producing the curable resin of this invention comprises reacting acrylic acid and/or methacrylic acid [which is hereinafter cited as (metha-)acrylic acid] with hydroxyl group-containing resin (I) obtained by reacting a five-member cyclic compound having an unsaturated conjugated double bond represented by the general formula (A) given below;

GENERAL FORMULA (A):

(wherein R is an organic residue having from 1 to 3 carbon atoms; m and n are integers, and are in the relation of $m+n=6$) or the Diels-Alder addition product (A) and the compound (B) having both reactive carbon-carbon double bond or bonds and two or more hydroxyl groups within one and the same molecule.

According to the invention a curable coating composition is provided which contains said curable resin as vehicle.

DESCRIPTION OF THE INVENTION

As the five-member cyclic compound (A) having an unsaturated conjugated double bond represented by the general formula (A) given below which is used in the present invention,

GENERAL FORMULA (A):

(wherein R is an organic residue having from 1 to 3 carbon atoms; m and n are integers and are in the relation of $m+n=6$) or the Diels-Alder addition product thereof (A), one or more of the compounds selected from among cyclopentadiene, dicyclopentadiene, tricyclopentadiene and tetracyclopentadiene and the lower alkyl substituents thereof having from 1 to 3 carbon atoms (such as methyldicyclopentadiene) are preferable.

As the compounds (B) having both reactive carbon-carbon double bond or bonds and two or more hydroxyl groups within one and the same molecule, one or more of the compounds selected from among 2-butene 1,4-diol, 2,2-dimethylolpropylacrylate, 2,2,2-trimethylol ethylacrylate and 1,2-dihydroxyethylacrylate are preferable.

The hydroxyl group-containing resin (I) can be obtained by copolymerizing said compound (A) and said compound (B). In carrying out the reaction, the compound (A) and the compound (B) are reacted at a temperature from 150° to 350° C. in the presence or absence of a radical polymerization catalyst, if desired in the presence of a solvent.

The molar ratio of the compound (A) and the compound (B) in the above mentioned reaction is optionally selected within the range from 30/70 to 95/5 but in order to attain the objects of this invention, it is preferable that the molar ratio of the compound (A) and the compound (B) be between 40/60 to 80/20. The above mentioned copolymerized hydroxyl group-containing resin (I) may be in solid state at a room temperature. The softening point of said resin can be appropriately controlled by selecting reaction conditions such as reaction time or reaction temperature in accordance with the purposes of the applications thereof and can be controlled within the temperature range from 50° to 200° C. In producing the above mentioned resin, it is not always necessary that the purity of the compound (A) should be high. For example, it may be possible to use the fraction whose dicyclopentadiene purity is around 85% or higher obtained by thermally dimerizing cyclopentadiene or methylcyclopentadiene contained in a $C_5$ fraction produced by cracking the petroleum fraction such as naphtha at high temperature and by removing most of $C_5$ fractions such as $C_5$ olefin or $C_5$ paraffin by means of distillation.

The above mentioned resin (I) is reacted with (metha-) acrylic acid under the conventional esterifying conditions in the presence or absence of a catalyst to esterify the hydroxyl groups of the resin (I) with the carboxyl group of (metha-) acrylic acid to produce the curable resin of this invention.

In carrying out the above mentioned esterification, the objects of this invention can be attained by reacting from 0.5 to 1 mol of (metha-) acrylic acid with 1 equivalent mol of hydroxyl groups of the resin (I), but it is more preferable to use (metha-) acrylic acid in a sufficient amount for the perfect esterification. When less than 0.5 mol of the acid is used, the curing speed of the esterified resin is reduced, thus leading to unpreferable results. The reaction temperature upon the esterification reaction may be in the range of 20° and 150° C., preferably 80° and 130° C. Where a catalyst is used, an acid catalyst such as paratoluene sulphonic acid may be used.

The prescription of the components when the curable resin of this invention is used as the curable coating composition is given below;

1. ULTRAVIOLET RAY CURABLE COATING COMPOSITION FOR INKS:
   Curable resin of this invention: 30~80 wt%
   Pigment: 5~30 wt%
   Sensitizer: 3~30 wt%
2. CURABLE COATING COMPOSITION USED FOR HIGH SPEED PRINTING INKS:
   (i) The composition prepared by adding into said composition of the above given prescription (1) less than 40% by weight of a solvent based on the total weight of the composition.
   (ii) The composition prepared by adding 3~30% by weight of sensitizer and 5~30% by weight of pigment to 30~80% by weight of a produced vehicle (solvent+resin), where the amount of the solvent in the vehicle is below 50% by weight based on the total weight of the vehicle.

When the curable resin of this invention is used as the curable coating composition for ink, various conventional pigments such as CARMIN 6B, PHTHALOCYANINE BLUE, BENZIDINE YELLOW, etc., can be used.

When the resin of this invention is used as the vehicle for off-setting printing inks, the above mentioned hydroxyl group-containing resin (I) may first be modified with rosin, hydrogenated rosin, or resol type phenol resin, and thereafter subjected to said esterification.

The curable coating resin of this invention obtained as described above can be easily cured by projecting ultraviolet ray or radiation such as electron ray, and therefore it is very preferable to be used as the vehicle for printing inks.

The softening point of the resin of this invention for curable coating is generally from 30° to 150° C., and when the softening point is low, it is easily melted by heating into fluidal state, and therefore printing inks can be produced only by uniformly mixing pigments into said resin without using solvent, whereas when softening point is high, inks can be produced by blending pigments with the solvent solution of said resin.

As the solvent to be used in producing printing inks, conventional solvents such as aliphatic or aromatic hydrocarbons, or drying oils can be used, but in order to quickly and easily carry out curing thereof, it is preferable to use the below given reactive solvent.

Namely, as the reactive solvents to be used in this invention, one or a mixture of not less than two of the reactive monomers each having double bond or bonds capable of being cross-linked with the esterified resin by heating or by the radiation of ultraviolet ray or electron ray.

As such reactive monomers, acrylic acid derivatives or vinyl compounds such as styrene can be preferably used, and as the especially preferable examples of such reactive monomers, acrylic acid derivatives can be used.

As the concrete examples of such compounds, the following can be given;
reactive monomers having acryl or methacryl residues, such as
   pentaerythritoltetra(metha-)acrylate,
   pentaerythritoltri(metha-)acrylate,
   trimethylolpropantri(metha-)acrylate,
   ethyleneglycoldi(metha-)acrylate,
   diethyleneglycoldi(metha-)acrylate,
   1,3-butanedioldi(metha-)acrylate,
   1,4-butanedioldi(metha-)acrylate,
   1,6-hexanedioldi(metha-)acrylate,
   2-hydroxyethyl(metha-)acrylate,
   2-hydroxypropyl(metha-)acrylate,
   alkyl(metha-)acrylate(alkyl group having $C_1 \sim C_{18}$),
   glycidyl(metha-)acrylate, etc.
   (In the above given examples, (metha-) acrylate means acrylate or methacrylate).

The curable coating composition prepared by dissolving the curable resin of this invention into the above given reactive solvents, can be cured through cross-linking reaction by heating or the exposure to radiation very quickly when compared with the curable coating composition disclosed in Kokai Pat. No. 124133/1974 and the quicker curing is the characteristic of this invention. In particular, when the resin of this invention is used for the curable off-set inks, excellent features can be attained.

In addition, in the curing of the coating composition of this invention the used solvent is converted into a component of the coating material by cross-linking reaction, and since the solvent is not evaporated out as in the conventional organic solvents, there is no pollution problem at all as generally accompanied with the production of solvent vapor.

The above mentioned curable coating resin can be mixed with curing promoter for further promoting the curing thereof when said curable coating resin is used as the vehicle for printing ink, which in most cases is preferred.

As the examples of such curing promoter as mentioned above, organic peroxides such as benzoyl peroxide, azobisisobutylnitrile or lauroyl peroxide, etc can be used independently or can be used along with decomposition promoters for the organic peroxide such as heavy metals salts, e.g. cobalt or manganese salts of organic acids or inorganic acids. Alternatively, ketone resin can be used as thermosetting promoter.

When the above mentioned composition is cured by exposing to ultraviolet ray, various kinds of sensitizers such as benzoine ether, benzophenone, benzoquinone, benzyl, 4,4'-bisdiethylaminobenzophenone, tetramethyldiaminobenzophenone, etc. can be used as curing promoters.

In addition to printing inks, the curable resin according to the invention can be used for various kinds of paints.

EXAMPLES OF THE INVENTION

The present invention is further illustrated in accordance with the examples, and in the following examples, "part" stands for "part by weight" unless otherwise specified.

EXAMPLE 1

84 g of 97% dicyclopentadiene, 56 g of cis-2-butene-1,4-diol and 60 g of the commercially available mixed xylene were charged into an autoclave provided with a stirrer and the reaction was carried out at 260° C. for 5 hours. After the reaction, the autoclave was cooled off and the reaction mixture was distilled, and then unreacted monomer, oligomer and xylene were distilled off. 97 g of the Resin (I)-1 was obtained.

The softening point of the Resin (I)-1 was 117° C. and the amount of hydroxyl contained therein was 0.49 g mol/100 g. Next, 65 g of the Resin (I)-1 and 35 g of acrylic acid were reacted by using 2 g of paratoluene sulfonic acid as the catalyst in the presence of 0.1 g of hydroquinone as polymerization inhibitor, under benzene reflux for 10 hrs. After the reaction benzene was distilled out, and Resin (II)-1 was obtained.

EXAMPLE 2

132 g of 97% dicyclopentadiene, 190 g of 2,2,2-trimethylolethylacrylate and 100 g of toluene were reacted in an autoclave at 260° C. for 5 hours. After the reaction, the reaction mixture was distilled, and then unreacted monomer, oligomer and toluene were distilled out whereby 280 g of Resin (I)-2 was obtained. The resin (I)-2 has a softening point of 82° C. and hydroxy content of 0.80 g mol/100 g.

Next, 63 g of Resin (I)-2 and 37 g of acrylic acid were reacted by using 2 g of paratoluene sulfonic acid as the catalyst in the presence of 0.1 g of hydroquinone under benzene reflux for 14 hours to produce Resin (II)-2.

EXAMPLE 3

$C_5$ cracked oil fraction (whose boiling point is from 28° to 60° C.) by produced in the steam cracking of naphtha for the production of ethylene, propylene and the like, was heated at 120° C. for 4 hours. 85% of dicyclopentadiene was contained in the residue obtained by removing $C_5$ fraction by means of distillation, and in addition to dicyclopentadiene, cyclopentadiene and isoprene or piperylene codimer, etc. were contained. 160 g of the fraction containing 85% of dicyclopentadiene, 90 g of 2-butene-1,4-diol and 100 g of xylene were reacted in an autoclave at 250° C. for 6 hours, and then the reaction mixture was distilled to produce 180 g of Resin (I)-3. The softening point of Resin (I)-3 was 93° C. and the amount of hydroxy group contained therein was 0.50 g mol/100 g.

Next, 65 g of Resin (I)-3 and 35 g of acrylic acid were reacted for 12 hours by using 2 g of paratoluene sulfonic acid as the catalyst in the presence of 0.1 g of hydroquinone under benzene reflux. After the reaction, benzene was distilled out to produce Resin (II)-3.

COMPARATIVE EXAMPLE 132 g of 97% dicyclopentadiene, 58 g of allyl alcohol and 110 g of the commercially available mixed xylene were reacted in an autoclave at 260° C. for 5 hours. After the reaction, the reaction mixture was distilled to distill off unreacted monomer, oligomer and xylene. 150 g of Resin (I)-4 was obtained. The softening point of Resin (I)-4 was 93° C. and the amount of hydroxyl group contained therein was 0.34 g mol/100 g. Next, 75 g of Resin (I)-4 and 25 g of acrylic acid were reacted for 12 hours by using 2 g of paratoluene sulfonic acid as the catalyst in the presence of 0.1 g of hydroquinone as polymerization inhibitor under benzene reflux. After the termination of the reaction, benzene was distilled out therefrom to produce Resin (II)-4.

Red inks for off-set printing were prepared by using Resin (II)-1~4 obtained in Examples and Comparative Example 1~4 as vehicles in accordance with the below given prescription.

| PRESCRIPTION OF RED INKS FOR OFF-SET PRINTING: | |
|---|---|
| Vehicle (resins of Examples and Control) | 45 parts |
| Trimethylol propane triacrylate | 31 parts |
| CARMIN 6B (Trade Name of Monoazo pigment produced by Toyo INK K.K.) | 16 parts |
| Benzophenone | 7 parts |
| 4,4'-bisdiethylaminobenzophenone | 1 part |

The obtained off-set inks were supplied to HYDEL KORD off-set press (produced by Heidelberger Bruckmachinene AG) and printings were done on art papers, and then the printings were dried on a conveyor under the radiation of a 2 KW high pressure mercury lamp H-2000L (produced by Toshiba K.K.) having the strength of 60 w/cm at an elevation of 12 cm above the printings.

The results of the evaluation of thus obtained inks are given below;

| | (Remark 1) EXPOSURE SENSITIVITY | (Remark 2) GROSS | (Remark 3) PRINTABILITY |
|---|---|---|---|
| EXAMPLE 1 Resin (II)-1 | 35 m/min. | GOOD | GOOD |
| EXAMPLE 2 Resin (II)-2 | 38 m/min. | GOOD | GOOD |

|  | (Remark 1) EXPOSURE SENSITIVITY | (Remark 2) GROSS | (Remark 3) PRINTABILITY |
|---|---|---|---|
| EXAMPLE 3 Resin (II)-3 | 36 m/min. | GOOD | GOOD |
| CONTROL Resin (II)-4 | 23 m/min. | LITTLE POOR | GOOD |

Remark 1: The conveyor speed required for the printings to be dried by the finger touching method was made the exposure sensitivity.
Remark 2: The dried printing were observed with naked eyes for comparison.
Remark 3: PS plate sheet was used. By printing with Hydel KORD off-set press, the evaluation of the printings was made.

While the present invention has been described with reference to the specific examples, it is understood that various modifications and variations can be made without departing from the spirit of the invention. It is intended to include all such variations and modifications.

What is claimed is:

1. A curable coating composition comprising 30–80% by weight of a curable resin product of hydroxyl group-containing resin (I) esterified with acrylic acid and/or methacrylic acid, said resin (I) being a copolymerization product of a five-member cyclic compound having an unsaturated conjugated double bond represented by the general formula (A) given below;

GENERAL FORMULA (A):

(Wherein R is an organic residue having from 1 to 3 carbon atoms; m and n are integers and are in the relation of m+n=6) or the Diels-Alder addition product thereof (A) with a compound (B) having both reactive carbon-carbon double bond or bonds and two or more hydroxy groups within one and the same molecule, 5–30% by weight of pigment and 3–30% by weight of sensitizer and less than 40% by weight of a solvent based on the total weight of the composition, said solvent comprising one or a mixture of two or more of reactive monomers having double bond or bonds.

2. The curable coating composition according to claim 1, wherein said reactive monomer is from among reactive monomers having an acryl or methacryl residue selected from the group consisting of pentaerythritol tetraacrylate or methacrylate, pentaerythritol triacrylate or methacrylate, trimethylolpropane-triacrylate or methacrylate, ethylene glycoldiacrylate or methacrylate, diethylene glycoldiacrylate or methacrylate, 1,3-butanedioldiacrylate or methacrylate, 1,4-butanediol diacrylate or methacrylate, 1,6-hexanedioldiacrylate or methaacrylate, 2-hydroxyethylacrylate or methacrylate, 2-hydroxypropylacrylate or methacrylate, alkylacrylate or methacrylate (alkyl group having $C_1$-$C_{18}$) and glycidyl acrylate or methacrylate.

UNITED STATES PATENT OFFICE
CERTIFICATE OF CORRECTION

Patent No. 4,163,763  Dated August 7, 1979

Inventor(s) Shozo Tsuchiya, et al.

It is certified that error appears in the above-identified patent and that said Letters Patent are hereby corrected as shown below:

"Assignee: Nippon Oil Company, Limited,
Tokyo, Japan"

should read

--Assignees: Nippon Oil Company, Limited,
Tokyo, Japan

Toyo Ink Manufacturing Company, Limited,
Tokyo, Japan--

Signed and Sealed this

Nineteenth Day of February 1980

[SEAL]

Attest:

SIDNEY A. DIAMOND

Attesting Officer  Commissioner of Patents and Trademarks